(12) United States Patent
Westcott (10) Patent No.: US 7,258,765 B2
(45) Date of Patent: Aug. 21, 2007

(54) VAPORIZATION CHAMBER, AND DISTILLATION SYSTEM COMPRISING SAME, PROVIDING IMPROVED TEMPERATURE SENSING OF LIQUID CONTAINED IN THE CHAMBER

(75) Inventor: Robert D. Westcott, Canby, OR (US)

(73) Assignee: Drawform, Inc., Canby, OR (US)

( * ) Notice: Subject to any disclaimer, the term of this patent is extended or adjusted under 35 U.S.C. 154(b) by 372 days.

(21) Appl. No.: 10/712,794

(22) Filed: Nov. 12, 2003

(65) Prior Publication Data

US 2005/0098425 A1     May 12, 2005

(51) Int. Cl.
*B01D 3/42* (2006.01)
(52) U.S. Cl. .......... 202/160; 202/181; 202/185.1; 202/197; 202/206; 159/17.4; 159/27.4; 159/44; 159/901; 159/DIG. 2
(58) Field of Classification Search .......... 159/901, 159/26.2, 17.4, 27.3, 44, 27.4, DIG. 2; 202/197, 202/160, 181, 185.1, 206
See application file for complete search history.

(56) References Cited

U.S. PATENT DOCUMENTS

| | | | |
|---|---|---|---|
| 847,085 A | | 3/1907 | Lehnert |
| 863,031 A | | 8/1907 | Lehnert |
| 1,253,411 A | | 1/1918 | Melchior |
| 2,103,635 A | | 12/1937 | Palmer |
| 2,331,399 A | * | 10/1943 | Keammerer ............. 137/556.3 |
| 3,057,786 A | | 10/1962 | Waddill |
| 3,334,026 A | * | 8/1967 | Dobell ........................ 203/10 |
| 3,635,799 A | | 1/1972 | Lowi, Jr. |
| 3,676,307 A | | 7/1972 | Black |
| 3,693,322 A | | 9/1972 | Lineberry et al. |
| 3,766,017 A | * | 10/1973 | Moss ........................ 202/187 |
| 3,822,192 A | * | 7/1974 | Brown ......................... 203/49 |
| 4,052,267 A | | 10/1977 | McFee |
| 4,120,816 A | | 10/1978 | de Lautrec et al. |
| 4,168,211 A | * | 9/1979 | Pottharst, Jr. ................ 203/10 |
| 4,693,786 A | * | 9/1987 | Brett et al. ................... 202/83 |
| 4,734,167 A | | 3/1988 | Goeldner |
| 4,750,975 A | | 6/1988 | Parker et al. |
| 4,836,891 A | * | 6/1989 | Files et al. ................. 159/28.1 |
| 4,911,189 A | | 3/1990 | Halbert |
| 4,929,312 A | | 5/1990 | Westcott |
| 4,957,624 A | | 9/1990 | Peranio |
| 5,020,335 A | * | 6/1991 | Albers et al. ................. 62/271 |
| 5,217,904 A | * | 6/1993 | Bruno ........................ 436/181 |

(Continued)

*Primary Examiner*—Virginia Manoharan
(74) *Attorney, Agent, or Firm*—Klarquist Sparkman, LLP (57) ABSTRACT

Vaporization chambers (distillation "pots") are disclosed in which the liquid contained in such a pot is heated and circulated to establish thermal uniformity of the liquid and to route the circulated liquid past a thermally conductive member that contacts the liquid. The thermally conductive member extends from a location on a wall of the pot in a portion of the pot that holds the liquid as the liquid is being heated in the pot and conducts thermal energy directly from the liquid to a location outside the pot corresponding to the location on the wall. The pot desirably is divided into an upper portion and lower portion, wherein the liquid circulates from the lower portion to the upper portion and from the upper portion to the lower portion during heating. During this circulation, bubbles formed in the liquid can be routed into the upper portion in a manner resulting in fracture of the bubbles and recovery of liquid entrained in the bubbles, thereby preventing foam accumulation in the pot.

33 Claims, 6 Drawing Sheets

U.S. PATENT DOCUMENTS

| | | |
|---|---|---|
| 5,236,580 A | 8/1993 | Kelleher |
| 5,535,989 A * | 7/1996 | Sen .......................... 261/112.1 |
| 5,827,374 A | 10/1998 | Mansur |
| 6,588,497 B1 * | 7/2003 | Glezer et al. .................. 165/84 |
| 2004/0060808 A1 * | 4/2004 | LaViolette .................. 202/234 |
| 2006/0176357 A1 * | 8/2006 | Okada ......................... 347/171 |

* cited by examiner

VAPORIZATION CHAMBER, AND
DISTILLATION SYSTEM COMPRISING
SAME, PROVIDING IMPROVED
TEMPERATURE SENSING OF LIQUID
CONTAINED IN THE CHAMBER

FIELD

This disclosure pertains generally to solvent-recovery systems that utilize distillation or a related technique to convert a solvent, in a mixture including the solvent, into a vapor that is condensed and recovered in purer form than in the mixture. More specifically, the disclosure pertains to evaporator vessels used for containing a solvent mixture while the mixture is being distilled, and to solvent-distillation apparatus including such evaporator vessels.

BACKGROUND

The use of solvents in various cleaning operations remains widespread, despite increasingly strict environmental regulations concerning the use and/or release into the environment of certain types of solvents. For example, organic solvents (including halogenated solvents) are used extensively for cleaning machined parts during manufacture of the parts. Organic solvents also are used extensively for cleaning parts, such as engine parts and other parts from motor vehicles, during repair or refurbishment operations of such vehicles. In fact, use of an organic solvent is frequently the only practical way in which to remove grease, sludge, varnish, and similar deposits from many types of parts.

Not only are the costs of organic solvents continuing to increase, but certain specific solvents are increasingly the subject of strict governmental regulation in terms of the conditions under which the solvents can be used and in terms of disposal of the solvents. Certain solvents (such as halogenated solvents) have become regulated so intensively that many prior uses of such solvents have become curtailed substantially.

As a result of situations as summarized above, in many instances it is most practical for a user of a cleaning solvent simply to recover and purify (i.e., "recycle"), on site, the solvent that has become laden with solutes as a result of using the solvent for cleaning purposes. In this regard, distillation of the solute-laden solvent mixture is a favored solvent-recycling and -recovery method because distillation can be performed using a compact apparatus that can be installed almost anywhere. As is well known, distillation typically involves heating a liquid solvent-containing mixture in an evaporator vessel (also termed the "pot") to produce a vapor of substantially only the solvent (disregarding formation of azeotropes). The solvent vapor is conducted to a condenser that converts the vapor into a corresponding liquid. Because mostly solvent vapor is released from the liquid mixture in the pot, substantially all of the solute is left behind in the pot, and the condensed liquid usually is substantially purer with respect to the solvent than the liquid remaining in the pot.

Distillation is well known as a purification technique for any of various solvents, including water. The many types of distillation systems disclosed in the art have various respective features that reportedly improve the utility, efficiency, and/or applicability of the technique for particular conditions of use. Depending upon the particular configuration or condition of use of the distillation system, certain parameters may or may not have substantial importance.

For example, solvent-distillation apparatus are used in automotive repair shops and the like where the removal of grease, oil, sludge, and the like from parts is a critical aspect of the repair business. Advantageously, such solvent-distillation apparatus are compact in size, energy-efficient, safe to use (including under conditions in which personnel are not present), and reliable. An example of such an apparatus is disclosed in U.S. Pat. No. 4,929,312 to the current Applicant. Similar to many other types of distillation apparatus, the apparatus disclosed in the '312 patent includes an evaporation vessel ("pot") made of metal and configured to contain a solvent liquid to be distilled. The pot includes a heating unit that heats the liquid in the pot sufficiently (typically to boiling) for production of solvent vapor for distillation. The solvent vapor passes from the pot to a condensing unit that cools the vapor to a liquid (comprising purified solvent) that is collected for re-use.

It has been discovered that a key performance criterion for a distillation system, such as the system disclosed in the '312 patent, is an ability to sense the temperature of the liquid in the pot accurately and in real time. In the apparatus of the '312 patent, the heating unit is embedded in a thick mass of metal (e.g., aluminum) at the bottom of the pot. The temperature of the liquid in the pot is sensed, for control purposes, by a thermostatic switch attached to a side wall of the pot or to the mass of metal at the bottom of the pot. With the thermostatic switch at either location, a substantial amount of heat energy must be applied to the metal of the pot to cause a significant change in temperature as sensed by the thermostatic switch. As a result, especially under conditions of temperature change, the temperature sensed by the thermostatic switch does not accurately track in real time the actual temperature of the liquid in the pot. For example, consider a thermostatic switch situated such that the heating unit is between the thermostatic switch and the inside wall of the pot. With this configuration the temperature sensed by the thermostatic switch may lead or not lead, depending upon whether the heating unit is energized or not energized. Also, the resulting dampening of temperature sensing allows substantial swings in temperature of the liquid to occur without being sensed at all by the thermostatic switch. Consequently, safe and efficient operation of the apparatus can be compromised.

SUMMARY

The deficiencies of conventional systems as summarized above are satisfied by vaporization chambers and vessels as disclosed herein, as well as by distillation systems comprising such chambers and vessels.

According to a first aspect of the instant disclosure, vaporization vessels ("distillation pots") are disclosed that comprise walls including a heated wall and a cover that collectively define an interior space. A liquid is contained in the interior space as the liquid is being heated in the pot for a distillation purpose. The pot includes a plate configured and situated in the interior space so as to divide the space into an upper portion and a lower portion that hydraulically communicate with each other by an upper fluid passageway and a lower fluid passageway defined by the plate. A thermally conductive member extends from a location on an inside surface of a wall into the liquid. The thermally conductive member is configured to be contacted by the liquid whenever the pot contains liquid being heated for distillation. The thermally conductive member also serves as a direct thermal connection from the liquid to a corresponding location outside the wall, adjacent the location on the inside surface, at which the temperature of the liquid in the pot can be sensed. The thermally conductive member extends into the lower fluid passageway so as to contact and be at the temperature of the liquid passing through the lower fluid passageway. As the liquid is being heated in the pot, the liquid circulates from the lower portion through the upper fluid passageway to the upper portion, and from the upper portion through the lower fluid passageway past the thermally conductive member to the lower portion.

Desirably, the heated wall is located in the lower portion, and the thermally conductive member extends into the lower portion. In this configuration, as the liquid is heated in the lower portion, the liquid contacts the thermally conductive member.

The upper fluid passageway can be configured so as to define a reflux vent extending from the lower portion and that opens into the upper portion. Bubbles passing through the upper fluid passageway from the lower portion break in the upper portion to release entrained liquid that drains into the lower portion through the lower fluid passageway. In a more specific embodiment in which the heated wall is located in the lower portion, bubbles formed in the liquid in the lower portion can be guided by the plate to the reflux vent. The bubbles travel up the reflux vent to the upper portion where the bubbles release entrained liquid for circulation through the lower fluid passageway and past the thermally conductive member to the lower portion. Desirably, the bubbles are propelled from the reflux vent against the inside surface of the cover, thereby releasing the entrained liquid.

Another embodiment of a distillation pot comprises walls, including a heated wall, and a cover that collectively define an interior space in which a liquid is contained as the liquid is being heated in the pot. The pot includes a reflux plate that is configured and situated in the interior space so as to have a vertical portion and a sloped portion including a lower end and a higher end. The sloped portion has peripheral edges between the higher and lower ends. The pot also includes a thermally conductive member extending from a location on an inside surface of a wall into the liquid. The thermally conductive member is configured so as to be contacted by the liquid whenever the pot contains liquid being heated for distillation and to serve as a direct thermal connection from the liquid to a corresponding location outside the wall, adjacent the location on the inside surface, at which the temperature of the liquid in the pot can be sensed. The peripheral edges of the sloped portion are sealingly attached to respective inside surfaces of the walls so as to divide the interior space into an upper portion and a lower portion (in which the heated wall is located) that communicate with each other via the higher end and the lower end. The vertical portion extends upward from the higher end relative to a respective inside surface of a wall so as to define a reflux vent between the vertical portion and the respective inside surface. The reflux vent opens in the interior space beneath the cover to provide the communication from the lower portion to the upper portion. The lower end extends, with an intervening clearance, around the thermally conductive member, wherein the clearance is sufficient to provide the communication from the upper portion to the lower portion such that, as the liquid is being heated in the pot, bubbles formed in the liquid in the lower portion are guided by the sloped portion to the reflux vent, rise up the reflux vent, and are propelled from the reflux vent against the inside surface of the cover. As the bubbles impact the inside surface, they break and release entrained liquid for passage through the clearance to below the reflux plate.

The distillation pot can comprise a heater in thermal contact with the heated wall. The heated wall can be, for example, the bottom wall of the pot. The pot further can comprise a thermal sensor (e.g., a thermostatic switch) in thermal contact with the corresponding location outside the wall.

Desirably, the inside surface of the heated wall defines at least one vane situated and configured to provide thermal transfer from the heated wall to the liquid in the lower portion. The lower portion can include a bottom surface defining a drain port that slopes toward a drain port defined in a wall of the lower portion.

In the pot the clearance desirably is situated and configured such that that, as the liquid flows through the clearance from the upper portion to the lower portion, the liquid flows past the thermally conductive member while contacting the thermally conductive member. The thermally conductive member desirably has a fin-like configuration extending toward a center of the pot, wherein the fin-like configuration provides a high ratio of surface area to volume. For example, the ratio can be at least 20.

The distillation pot also desirably has a vapor outlet. In certain of the embodiments summarized above, the vapor outlet is situated on an opposite side of the pot from the reflux vent. Desirably, the vapor outlet is defined in the cover.

The distillation pot further can comprise a control valve hydraulically connected to a supply of liquid for distillation in the pot. In this embodiment the control valve comprises a level-sensing or analogous mechanism that is responsive to the liquid level in the pot so as to add liquid from the supply to the pot for distillation whenever the liquid in the pot is below a pre-determined level. By way of example the level-sensing mechanism can be a float assembly, wherein the float assembly is situated in the upper portion.

According to another embodiment, a distillation pot comprises wall means, including heated wall means, and cover means that collectively define an enclosed interior space in which a liquid is contained as the liquid is being heated in the pot for a distillation purpose. The pot includes interior-space-dividing means for dividing the interior space into an upper portion and a lower portion that hydraulically communicate with each other by an upper fluid-passageway means and a lower fluid-passageway means. The pot further includes thermal-conduction means that extends from a location on an inside surface of a wall means into the liquid and is configured so as to be contacted by the liquid whenever liquid is in the interior space and is being heated for distillation and to serve as a direct thermal connection from the liquid to a corresponding location outside the wall means, adjacent the location on the inside surface, at which the temperature of the liquid in the pot can be sensed. The thermal-conduction means desirably extends into the lower portion and lower fluid-passageway means so as to contact and be at the temperature of the liquid passing through the lower fluid-passageway means. As the liquid is being heated in the pot, the liquid circulates from the lower portion through the upper fluid-passageway means to the upper portion, and from the upper portion through the lower fluid-passageway means past the thermal-conduction means to the lower portion.

According to another aspect, distillation systems are disclosed. An embodiment of such a system comprises a distillation pot such as any of the embodiments summarized above. The distillation system also includes a condensing unit that is situated relative to the pot so as to receive vapor produced by heating of the liquid in the pot and that is configured to condense the vapor to a corresponding liquid. The system further can comprise a heater in thermal contact with the heated surface of the pot. The system further can comprise a thermostatic switch or analogous appliance that is in thermal contact with the thermally conductive member. The thermostatic switch can be used, for example, for controlling operation of the heater. The pot also desirably includes a vapor outlet situated in an upper location of the pot and a conduit hydraulically connecting the vapor outlet to the condensing unit.

Another aspect of the disclosure is set forth in the context of a distillation method in which a liquid, contained in a distillation pot, is heated in the pot to produce a corresponding vapor that is condensed to form a distillate. This aspect is directed to methods for heating and controlling the temperature of the liquid in the distillation pot. An embodiment of such a method comprises the step of heating the liquid in a lower portion of the pot while guiding circulation of the liquid to an upper portion through an upper fluid passageway between the lower and upper portions. In the upper portion, circulation of the liquid in the upper portion is guided through a lower fluid passageway, between the upper and lower portions, to the lower portion. During circulation of the liquid through the lower fluid passageway, the liquid is caused to flow past a thermally conductive member situated so as to contact the liquid in the lower fluid passageway and in the lower portion. Heat energy is conducted from the liquid directly, via the thermally conductive member, to a location outside the pot, where the temperature of the location is sensed.

The sensing step desirably is performed using a thermal sensor that produces thermal data concerning the liquid in the lower portion and lower fluid passageway. This embodiment further can comprise the step of controlling, based on the thermal data, an amount of heat energy applied to the liquid in the pot during the heating step.

The method further can comprise the step of removing foam from the liquid in the upper portion. According to one embodiment, this foam-removal step comprises guiding bubbles, formed in the liquid in the lower portion, from the lower portion through the upper fluid passageway to impinge on an inside surface of a wall of the upper portion with sufficient force to fracture the bubbles. In the upper portion, entrained liquid released from the fractured bubbles is collected. The collected entrained liquid is circulated from the upper portion through the lower fluid passageway to the lower portion.

Another method embodiment comprises heating the liquid in a lower portion of a distillation pot while guiding bubbles, formed in the heated liquid, into an inlet of a reflux vent having an outlet situated above the inlet. The bubbles are moved up the reflux vent so as to cause the bubbles to be expelled from the outlet of the reflux vent onto a surface on which the bubbles fracture to release liquid entrained in the bubbles. The liquid released from the fractured bubbles is combined with liquid in an upper portion of the pot. Liquid is flowed from the upper portion to the lower portion through a fluid passage so as to replace the liquid from the lower portion carried, as entrained liquid, up the reflux vent. In the fluid passage, the liquid is flowed by, and thus is made to contact, the thermally conductive member extending from a wall of the pot. Heat energy is conducted from the liquid directly, via the thermally conductive member, through the wall of the pot to a thermal sensor situated outside the pot. Based on thermal data produced by the thermal sensor, a distillation parameter of the liquid in the pot during the heating step is controlled. The distillation parameter can be, for example, an amount of thermal energy applied to the liquid in the pot during the heating step.

Yet another method embodiment is directed to a method for heating a liquid in a vessel so as to convert the liquid into a vapor. According to an exemplary embodiment, heat is applied to a "heated wall" (desirably located in a lower portion of the vessel) to heat the liquid. While applying the heat, circulation is imparted to a fluid stream of the liquid from the lower portion to an upper portion of the vessel to release the vapor, and from the upper portion back to the lower portion. In the fluid stream from the upper portion to the lower portion, the fluid is caused to flow past a thermally conductive member situated so as to contact the liquid in the stream and in the lower portion. Heat energy is conducted from the liquid directly, via the thermally conductive member, through the vessel wall to a location outside the vessel. The temperature of the thermally conductive member is sensed outside the vessel wall.

The foregoing and additional features and advantages of the invention will be more readily apparent from the following detailed description, which proceeds with reference to the accompanying drawings.

BRIEF DESCRIPTION OF THE DRAWINGS

FIGS. 3(A)-3(E) are orthogonal views of the pot embodiment shown in FIG. 2, but not showing the reflux plate, wherein FIGS. 3(A)-3(C) are respective elevational views, FIG. 3(D) is a top plan view showing interior detail of vanes, and FIG. 3(E) is a bottom view showing external detail of the heater-element gland.

DETAILED DESCRIPTION

Certain aspects of an exemplary solvent-distillation system 10 are described below, referring to FIG. 1. The system 10 includes a chamber 11 configured to contain a supply of solvent 12 used for degreasing parts and for related uses. For such degreasing, the parts can be immersed directly in the solvent 12 in the chamber 11, or the chamber 11 can be provided with a pump, conduit, and nozzle (not shown) that discharge a stream of solvent from the chamber to a part held in the chamber such that grease- or oil-laden solvent drains from the part back into the chamber 11. Further alternatively, solvent can be removed from the chamber 11, used for cleaning at a remote location, and then returned to the chamber 11. The chamber 11 has an outlet 14 used for draining solvent 12 from the chamber as required. The outlet 14 is connected via a conduit 20 to an inlet 26 of an evaporator vessel ("pot") 24. The bottom 28 of the pot 24 is in thermal contact with a heater 30 (e.g., an electrical-resistance type) or analogous appliance that heats the liquid contained in the pot 24 for distillation purposes, as described later below.

Hence, the pot 24 usually contains a volume of solute-laden solvent delivered to the pot 24 from the chamber 12. To maintain a desired level of liquid within the pot 24, the inlet 26 is provided with a control valve 32 comprising a float assembly 36 including a buoyant member 38 that rises upwardly with increases in liquid volume in the pot 24. Whenever the solvent reaches a selected level, the control valve 32 and buoyant member 38 cooperate to close the inlet 26.

The pot 24 has a removable cover 40 that, in the depicted embodiment, includes a vapor outlet 39 to which a conduit 44 is connected that conducts vapor from the pot 24 to a condensing unit 46. The condensing unit 46 includes a heat exchanger 48. For example, the heat exchanger 48 is air-cooled with multiple cooling fins 50 and a motor-driven blower 54 that propels a stream of air over the cooling fins 50. Alternatively, the heat-exchanger 48 is liquid-cooled (not shown).

Connected to the heat exchanger 48 via a conduit 60 is an inlet 61 of a secondary accumulator 62. An outlet 66 of the secondary accumulator 62 is connected via a conduit 64 to an inlet 72 of a primary accumulator 76. Flow of condensate through the conduit 64 is controlled by a pressure-sensitive check valve 70. Adjacent the conduit 64 is a conduit 78 that leads from a port 74 in the primary accumulator 76 into a pressure-evacuation system including a vacuum transducer 80. The vacuum transducer 80 controls the flow of compressed air into and out of the distillation system 10, and employs a venturi to create a subatmospheric pressure in selected regions of the system 10, as described later below. The vacuum transducer 80 is connected to a solenoid valve 82 (or analogous automatically actuatable valve) that includes an inlet port 84 for receiving air from a conventional compressed source, and an outlet port 85. The solenoid valve 82 is connected to a timer 86 that operates the vacuum transducer 80 in a cyclical manner, as described later below. Whenever the solenoid valve 82 is actuated, compressed air from the source passes from the inlet port 84 through the solenoid valve to the outlet port 85. The vacuum transducer 80 includes a port 90 through which air flows into and out of the system 10 as desired. Adjacent the port 90 is an inlet 92 for receiving compressed air from the outlet port 85 of the solenoid valve 82. The compressed air is used by the vacuum transducer 80 to create a subatmospheric pressure in selected locations inside the system 10.

Leading from an outlet 94 in the primary accumulator 76 is a conduit 96 that terminates at the top 98 of the chamber 11. Provided at the end of the conduit 96 is a pressure-sensitive check valve 100 similar to the check valve 70.

A disposal system allows elimination of solute sludge (oil, grease, and the like) that has accumulated in the pot 24 from distilling off the solvent. An outlet 102 is provided adjacent the heater 30, which communicates with a conduit 104 leading into a waste-accumulation tank 106 or other suitable repository. The conduit 104 can include a valve 103 that can be manual or automatic. The conduit 104 can terminate with a pressure-sensitive check valve 108 (of the same type as the check valve 70). Either or both valves 103, 108 control the draining of sludge from the pot 24 into the waste-accumulation tank 106. As described in more detail later below, situated with respect to the pot 24 is a thermostatic switch 110 that communicates through wires or analogous connections with a solenoid valve 116 (or analogous automatically actuatable valve). The solenoid valve 116 has an inlet 118 and an outlet 120 connected via a conduit 124 into the conduit 44.

The distillation system 10 operates in a timed cycle, in which contaminated solvent 12 in the chamber 11 is routed to the pot 24 from which solvent is evaporated, and the resulting vapor of purified solvent is condensed and collected for re-use. Operational timing of the system 10 is controlled by appropriately setting the timer 86, which governs the time duration in which the system is "on" and whether certain components such as the heater 30 are on at times that are appropriate and safe. Turning the system 10 on in this manner actuates the solenoid valve 82, which supplies compressed air to the vacuum transducer 80 through the inlet 92 of the vacuum transducer. As a result, a subatmospheric pressure is created that that opens the check valve 70, allows air to be aspirated from the system through the port 90, and establishes a subatmospheric pressure in the pot 24, the conduit 44, the condensing unit 46, and the accumulators 62, 76. The subatmospheric pressure also seats the check valve 100, which prevents air from entering the system 10 from the chamber 11.

Due to the subatmospheric pressure in the pot 24, contaminated solvent is drawn from the chamber 11 through the conduit 20 into the pot 24. Solvent continues to flow into the pot 24 through the inlet 26 until the buoyant member 38 reaches a pre-selected level at which the control valve 32 closes the inlet 26 and thus shuts off flow of additional solvent into the pot 24.

Then, the heater 30 is activated (turned on), thereby initiating heating and causing vaporization of the solvent in the pot 24 under the subatmospheric conditions previously established in the pot. The subatmospheric pressure aids vaporization of the solvent in the pot 24. To achieve proper vaporization, the temperature of the heater 30 is adjusted according to the type of solvent in the pot 24. The vaporized solvent travels upward through the vapor outlet 39 in the cover 40 of the pot 24, through the conduit 44, and into the condensing unit 46, in which the vapor is condensed to a liquid. The condensed liquid (now a purified solvent) passes through the conduit 60, through the secondary accumulator 62 and check valve 70, and into the primary accumulator 76 in which the purified liquid solvent is stored temporarily.

Whenever the timer 86 cycles to "off," the solenoid valve 82 stops delivery of compressed air to the inlet 92 of the vacuum transducer 80. As a result, the vacuum transducer 80 no longer generates a subatmospheric pressure, and air flows into the system 10 through the port 90, restoring the primary accumulator 76 to atmospheric pressure. Meanwhile, the check valve 70 seats and maintains a subatmospheric pressure in the system upstream of the check valve 70. This subatmospheric pressure permits the system 10 to continue operating while the purified solvent in the primary accumulator 76 drains into the secondary accumulator 62 for temporary storage (due to the check valve 70 remaining seated).

Simultaneously with the seating of the check valve 70, the check valve 100 opens as atmospheric pressure is established inside the primary accumulator 76. This allows purified solvent in the primary accumulator 76 to flow through the conduit 96 back into the chamber 11 for reuse. When a subatmospheric pressure again is generated in the system 10 by the vacuum transducer 80, the check valve 100 seats as the check valve 70 opens, causing purified solvent temporarily stored in the secondary accumulator 62 to drain into the primary accumulator 76. The system 10 then repeats the pattern of operation described above.

As the system 10 continues to operate, waste solute (grease, oil, and the like) and other contaminants left behind in the pot 24 tend to accumulate as sludge in the pot 24. Removal of this accumulated sludge at the appropriate time is facilitated by setting the thermostatic switch 110 at an appropriate pre-selected temperature. (The temperature of the liquid in the pot 24 tends to increase as the percentage of sludge (solute) in the pot increases.) Upon reaching the pre-selected temperature, the thermostatic switch 110 turns off the heater 30 and activates the solenoid valve 116, thereby allowing entry of atmospheric air through the inlet 118. The air passes through the outlet 120, the conduit 124, the conduit 44, the cover 40, and into the pot 24. As a result, pressure is increased within the pot 24, which opens the check valve 108 and allows the sludge to pass from the pot 24 through the outlet 102 in the bottom 28 of the pot 24. The sludge passes through the conduit 104, through the check valve 108, and into the tank 106 for disposal.

As discussed earlier above, the conduit 104 or outlet 102 can be provided with an on-off valve 103 actuated by an operator, e.g., after confirming that the temperature of the sludge in the pot has cooled to a safe level. For example, an apparatus fitted with a pot 24 having a 6-quart capacity can be configured to initiate drainage of the pot whenever the volume of accumulated sludge in the pot reaches about 2 quarts. As discussed elsewhere herein, the thermostatic switch 110 can be configured to turn the heater 30 off whenever an excessive sludge volume has accumulated in the pot (wherein the heater 30 remains off until the thermostatic switch 110 is reset by the operator). The user then drains the sludge from the pot 24 through the valve 103 when the temperature of the liquid in the pot drops to a temperature (e.g., 150° F., as sensed by a thermometer discussed later below) at which the pot can be drained safely. Draining of the pot 24 is facilitated by venting the pot, as described above, through the inlet 118.

The manual on-off valve 103 can be replaced with an automatic, temperature-actuated on-off valve, such as a temperature-actuated solenoid valve, configured to open automatically for drainage of the pot 24 after the liquid in the pot has cooled to a safe temperature. Draining of liquid from the pot while the heater remains off results in a substantial decrease in temperature as sensed by the thermostatic switch 110. After the pot 24 has cooled to a suitably low temperature, the thermostatic switch 110 in the FIG.-1 embodiment deactivates the solenoid valve 116. The heater 30 can be activated either automatically or upon a confirmation (either automatic or manual) that the pot 24 has been filled with more liquid to be distilled.

During operation, as noted above, the heater 30 heats the liquid in the pot 24 sufficiently to produce copious amounts of solvent vapor from the liquid for the purpose of distillation. Typically, adequate vapor production is achieved during actual boiling of the liquid in the pot 24 under subatmospheric pressure (which facilitates boiling of the solvent at a lower temperature than if boiling were performed at atmospheric pressure). During boiling of the liquid in the pot 24, many bubbles of solvent vapor are formed rapidly, rise to the surface of the liquid, and break to release the vapor. The vapor rises (again, as facilitated by the subatmospheric pressure) through the conduit 44 to the condensing unit 46. Under such conditions, especially if the liquid in the pot 24 contains certain solutes or a large amount of dissolved solutes in general, excess foam is produced. If the pot 24 has a conventional configuration (and especially if the pot is compact in configuration), this foam can be difficult to control and/or to prevent from accumulating sufficiently to propagate up to the condensing unit 46. However, pots within the scope of the current disclosure are resistant to excess foaming and also provide more accurate and efficient sensing of the temperature of the liquid in the pot.

A representative embodiment of a pot 24 is depicted in FIG. 2 and FIGS. 3(A)-3(F), in which the pot 24 has side walls 130 and a "bottom" wall 131 desirably made as a single unit, such as by casting. The pot 24 desirably is made of a material that can be cast or molded easily (such as an aluminum alloy, cast iron, or other suitable metal) and that exhibits acceptably good thermal conductivity. As discussed above, in this embodiment a heater 30 is situated adjacent ("below") and in thermal contact with the bottom wall 131. The side walls 130 terminate with a flange 134 used for attaching (using screws or analogous fasteners) the cover 40 to the pot 24, thereby enclosing the pot 24 and defining an interior space 138 inside the pot 24. In the interior space 138 the solvent mixture to be distilled is contained as the mixture is being heated by the heater 30. Vapor produced by the heating rises in the pot 24 and passes from the pot to the condensing unit 46 via the conduit 44, as discussed above.

In the depicted embodiment in which the heater 30 is situated "below" the bottom wall 131, the heater 30 is nested in a gland 129 defined on the outer surface of the bottom wall 131. Extending upward from the inside surface of the bottom wall 131 are multiple vanes 133, baffles, or the like that facilitate turbulence of the liquid in the pot 24 as the liquid is being boiled by the heater 30. The vanes 133, and the fluid-turbulence they generate, provide substantially more efficient (compared to a pot lacking the vanes) thermal transfer from the bottom wall 131 (as heated by the heater 30) to the liquid contained in the pot, and prevent thermal stratification of the liquid. The depicted number, size, and orientations of the vanes 133 (see especially FIG. 3(D)) are not intended to be limiting. These parameters can be selected and optimized readily as prevailing conditions indicate.

In general, the vanes 133 extend from the "heated" wall of the pot 24. In the depicted embodiment (FIGS. 2 and 3(A)-3(F)), the heated wall is the bottom wall 131. However, this configuration is not intended to be limiting. In certain embodiments, it is desirable to heat the pot 24 from a wall other than, or in addition to, the bottom wall 131 (e.g., the side wall 130). In these other embodiments, vanes 133 can extend from the side wall in addition to the bottom wall or instead of from the bottom wall.

To control the disposition of and limit accumulation of foam bubbles in the pot 24, the pot is provided with a reflux plate 140 that, as mounted in the pot, has a "vertical" portion 142 and a sloped portion 144. The sloped portion 144 has a "lower" end 136, a "higher" end 137, and peripheral edges extending therebetween. As suggested in FIG. 2, the reflux plate 140 can be secured to the pot 24 by screws or analogous fasteners that extend through respective holes 156 in the sloped portion 144 and thread into or otherwise are attached to respective vanes 133, for example (see holes 157 in FIG. 3(D)). The sloped portion 144 extends nearly circumferentially (except for the higher and lower ends of the sloped portion) around the inside diameter of the pot 24. To facilitate establishment of a substantial seal between the peripheral edges and the inside surfaces of facing side walls 130, the periphery of the sloped portion 144 rests on and desirably is sealed to a shoulder 145 extending nearly circumferentially around the side walls 130. "Seal" is used here in a comparative sense, and does not necessarily denote establishment of a seal of hermetic integrity. Rather, the seal ensures that bubbles, formed in the liquid beneath the reflux plate, do not flow around the peripheral edges of the sloped portion (that are attached to the side wall) to the liquid above the reflux plate. The seal can be achieved using a suitable gasket 147 (e.g., an O-ring seated in a gland 149 defined in the shoulder 145). Alternatively, the seal can be achieved by, e.g., seating the peripheral edges of the sloped portion 144 into appropriately configured respective receptacles (not shown) in the shoulder 145 or extending around the inside surface of the side wall 130.

The lower end 136 of the sloped portion 144 is not sealed (as discussed later below) to the side wall 130, which allows liquid to drain from "above" the sloped portion 144 to "below" the reflux plate 140. During use the pot 24 is filled with solvent mixture to a level desirably approximately at the higher end 137 of the sloped portion 144 (see FIG. 1). Thus, some of the liquid in the pot is located above the reflux plate 140, and other liquid is located beneath the reflux plate 140. The vertical portion 142 of the reflux plate 140 extends "upward" from the higher end 137. The vertical portion 142 defines, along with the adjacent inside surface 146 of the side wall 130, an in-pot "reflux vent" or "foam chimney" 143. ("Vertical" is used here in an approximate sense; the vertical portion 142 need not be absolutely vertical, but rather sufficiently upwardly extending to function satisfactorily as a reflux vent.) Specifically, foam formed beneath the reflux plate 140 does not pass, to any significant extent, around the peripheral edges of the reflux plate. Rather, the foam is urged to travel beneath the sloped portion toward the reflux vent 143 and up the reflux vent toward the cover 40. The distal end of the vertical portion 142 is just beneath the adjacent inside surface of the cover 40. Thus, as the foam travels up the reflux vent 143, the bubbles are propelled against the inside surface of the cover 40 with sufficient force to fracture most of the bubbles. The entrained liquid released from the fractured bubbles drains back into the pool of liquid in the pot and is recirculated (as described below) to the liquid beneath the reflux plate 140.

Figure 1:
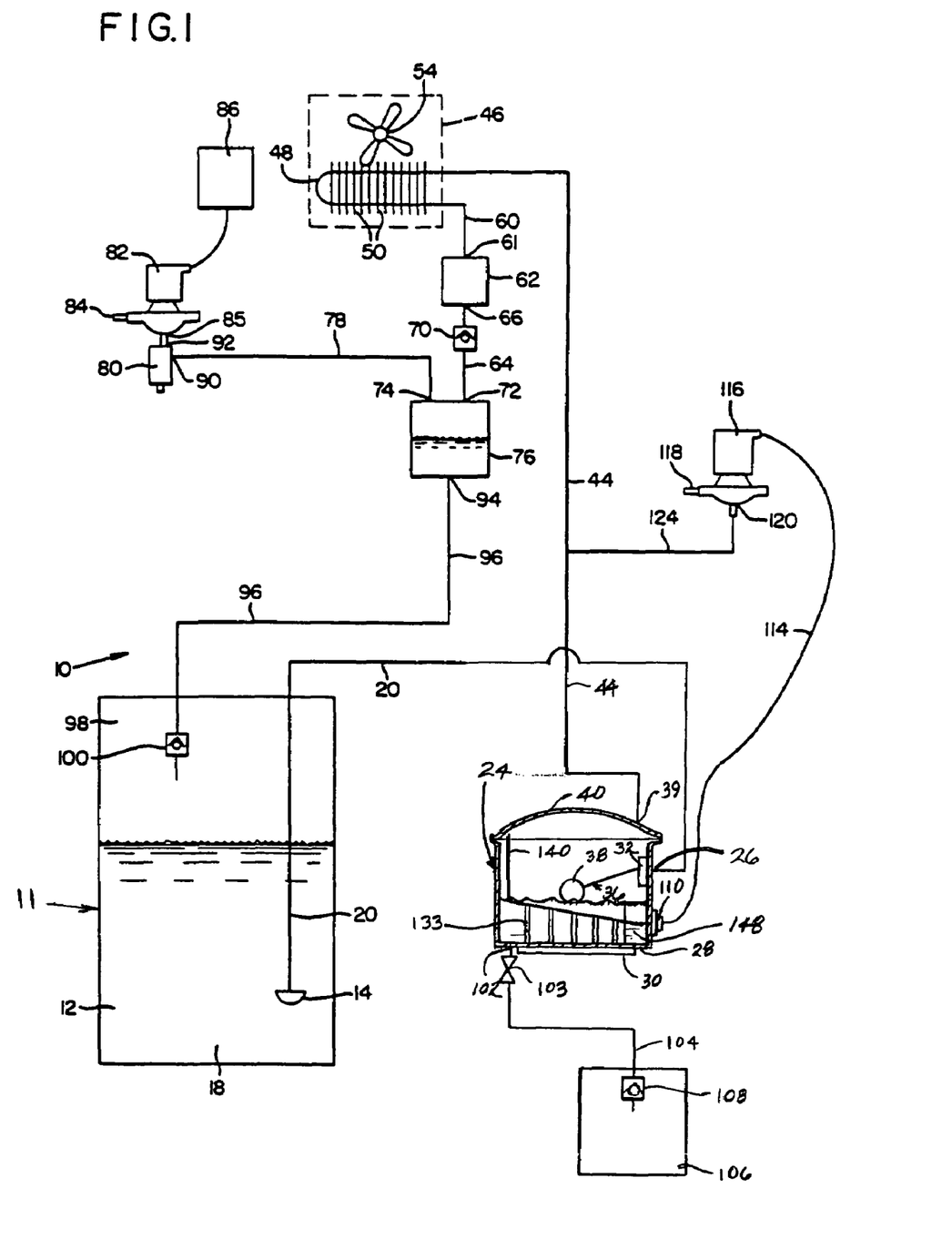
FIG. 1 is a schematic diagram of a representative embodiment of a distillation system that includes a vaporization chamber ("pot") as disclosed herein, wherein the pot is shown in section to reveal some interior detail.

Referring to FIG. 1, the control valve 32 desirably is mounted in a manner allowing the float assembly 36 to be located "above" the reflux plate 140. This allows an unrestrained range of vertical movement of the buoyant member 38 with normal fill volumes of the pot 24 and facilitates filling of the pot with the desired volume of solvent mixture to be distilled.

By way of example, the reflux plate 140 is made of sheet steel, sheet aluminum or other suitable metal, sheet polymeric material (preferably fiber-reinforced) or sheet composite material that is inert to the solvent, solutes, vapor, and operating temperature of the pot 24. Similarly, the cover 40 can be made of aluminum, steel, polymeric material (e.g., glass-reinforced nylon), or composite material that is suitably inert from a chemical and thermal standpoint to the conditions of use. The pot typically is mounted by legs 135 or analogous features to a platform or the like (not shown) in the distillation system 110.

The shape of the pot 24 desirably is substantially cylindrical as shown (for ease of fabrication), but it alternatively can be any other suitable shape as required or desired. By way of example, for use in distillation systems suitably sized for use in an automotive garage or similar facility, the pot 24 has an interior volume of approximately six quarts, wherein the pot normally is kept filled with approximately two quarts of solvent for distillation purposes. (Maintenance of this fill level is achieved using the control valve 32 and float assembly 36, as discussed above.) A pot 24 having such a size and made of cast aluminum has an exemplary wall thickness of $3/16$ to $1/4$ inch.

Figure 3A:
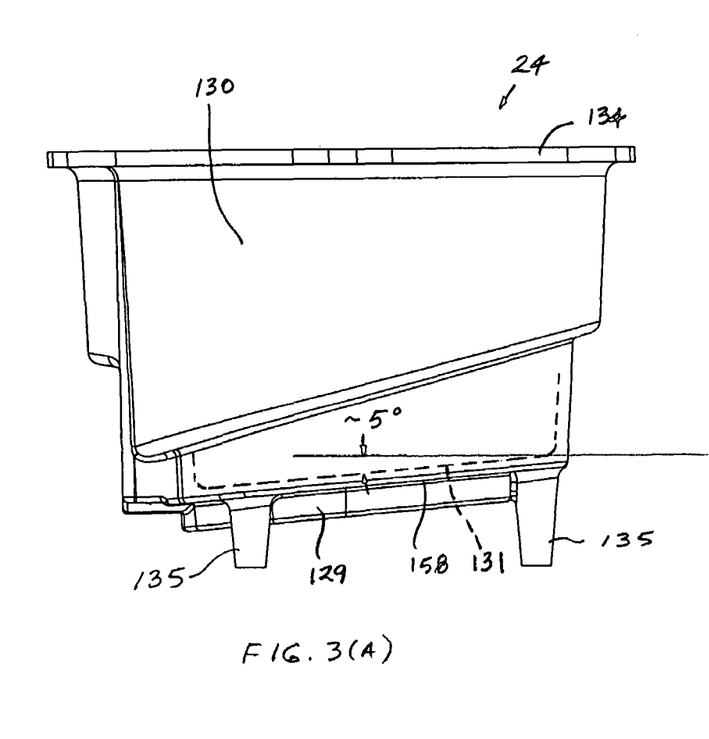
Figure 3B:
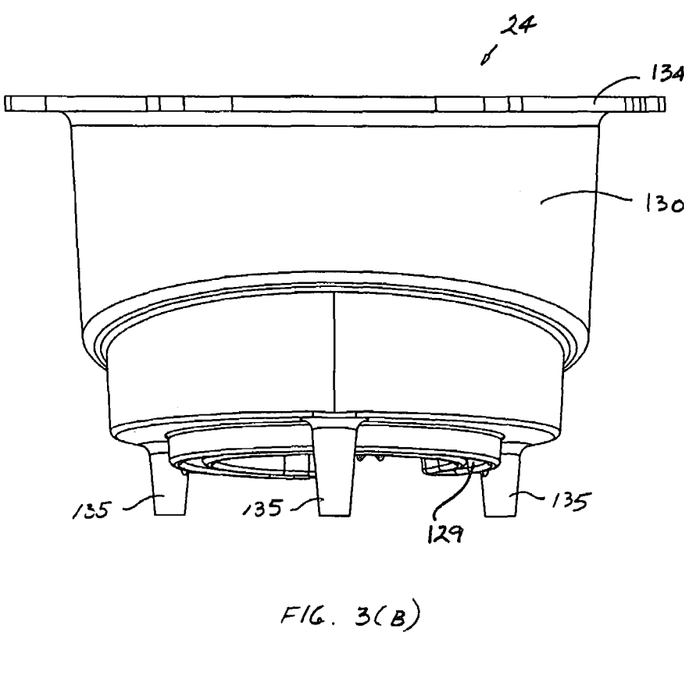
Figure 3C:
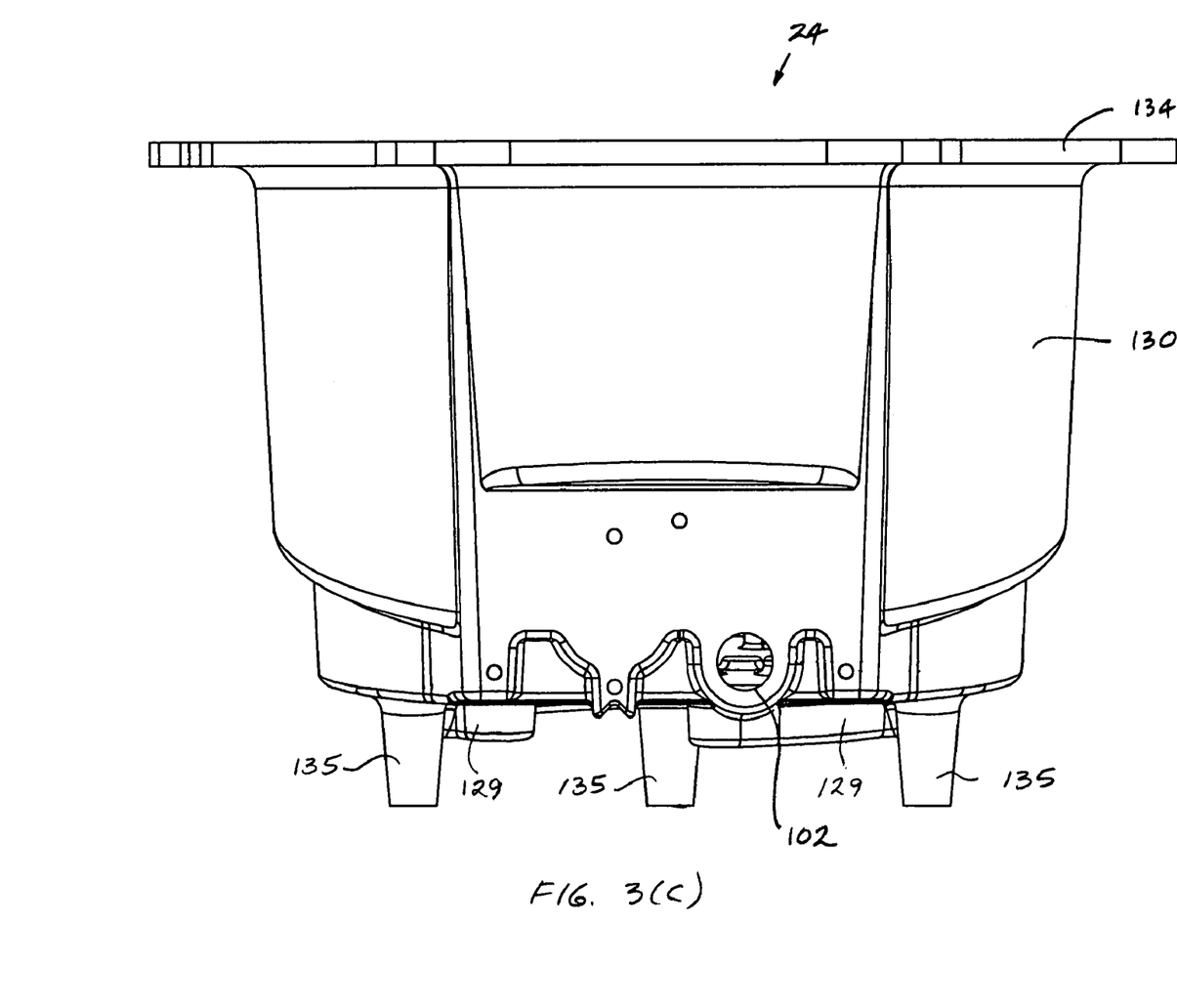
Figure 3D:
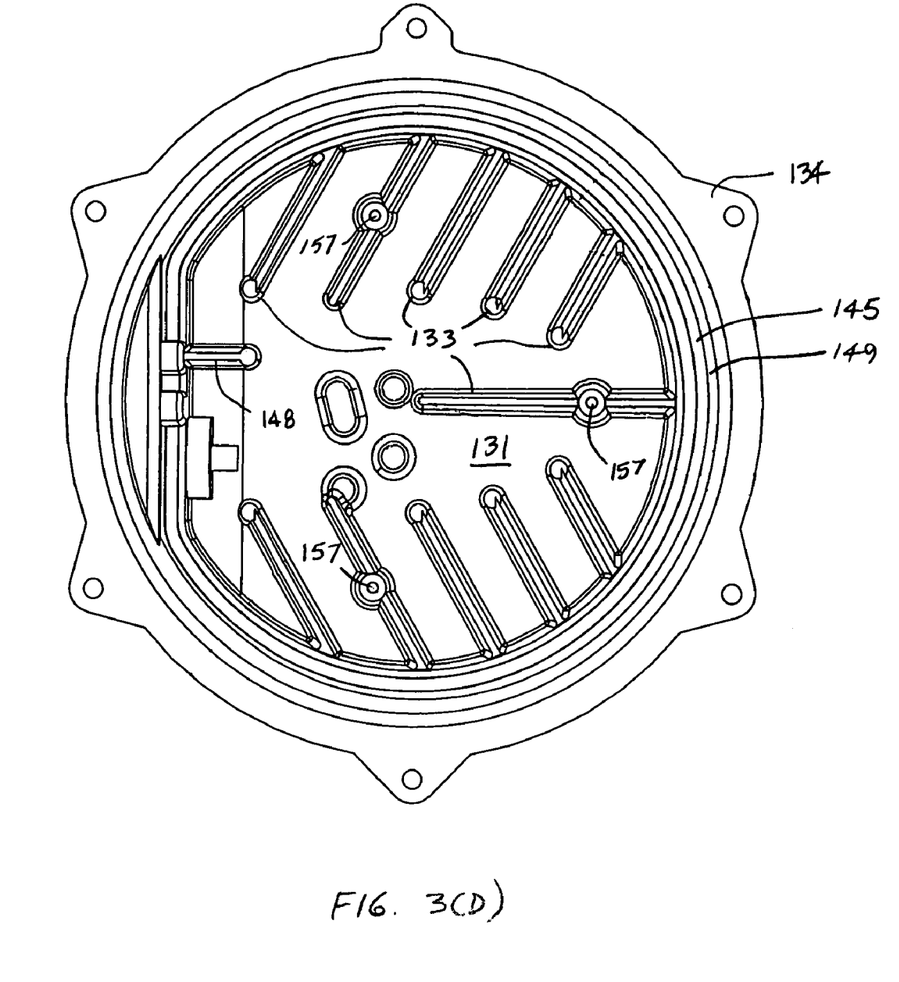
Figure 3E:
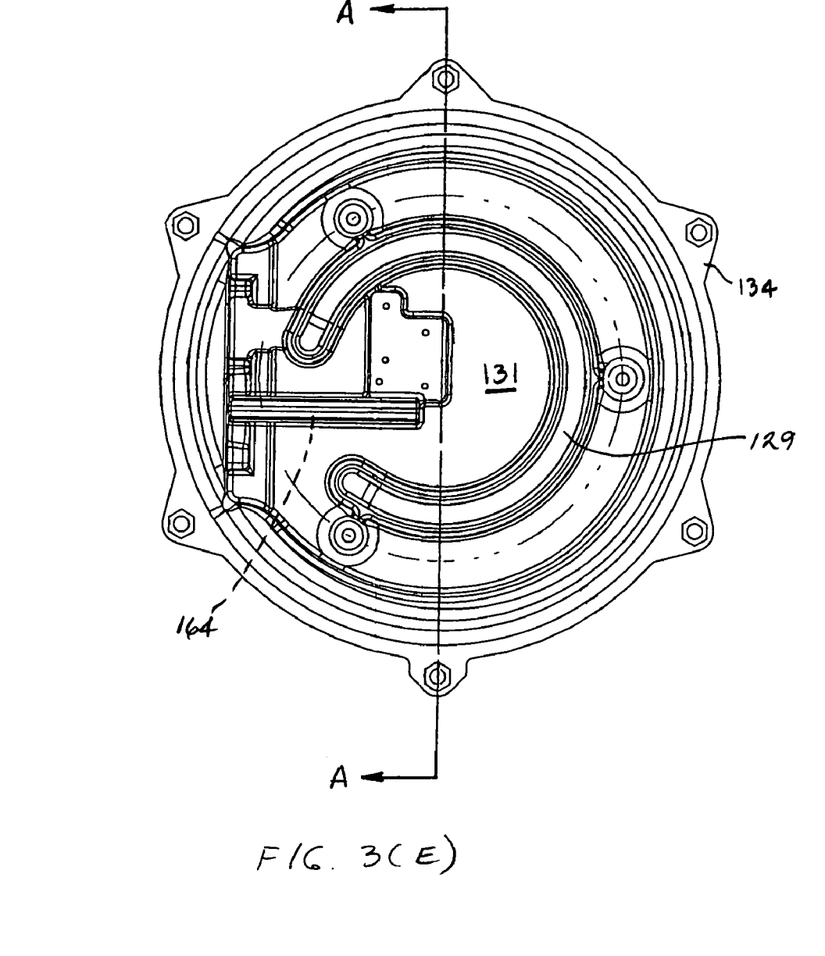
Figure 3F:
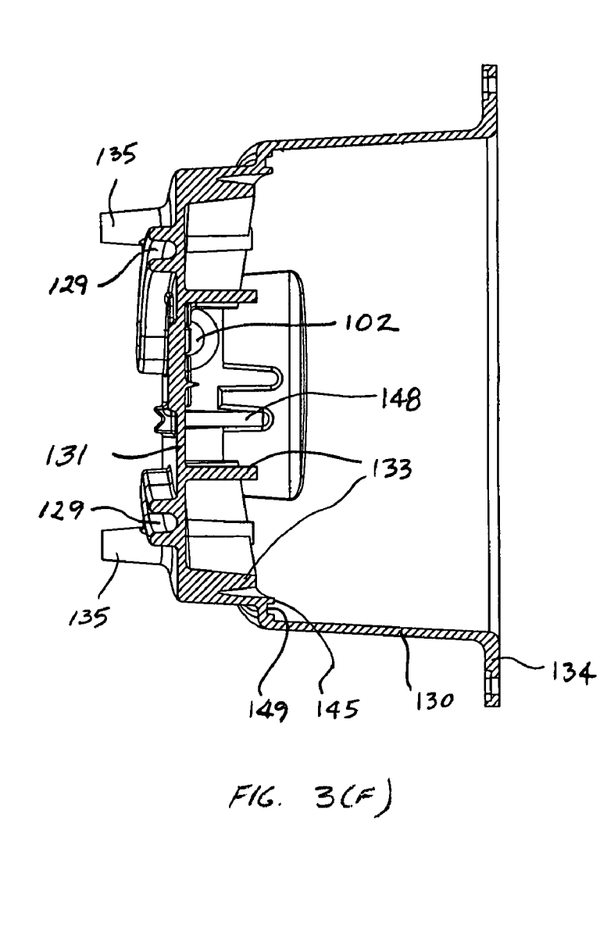
FIG. 3(F) is an orthogonal section along the line A-A in FIG. 3(E).

The bottom wall 131 of the pot 24 desirably is sloped (e.g., 5° from the horizontal, see FIG. 3(A)) downward to the outlet 102 to facilitate complete draining of liquid from the pot when desired. The sloped portion 144 of the reflux plate 140 desirably is sloped approximately 15° upward from the horizontal, toward the reflux vent 143. During boiling, many bubbles of vapor are formed in the liquid beneath the reflux plate 140. As the bubbles rise in the liquid, the sloped portion 144 effectively directs the bubbles toward the reflux vent 143. The bubbles rise up the reflux vent 143 and impact the inside surface of the cover 40, which breaks the bubbles and thus prevents accumulation of excess foam in the pot 24. The vapor outlet 39 (FIG. 1) desirably is situated on the opposite side of the pot from the reflux vent 143 to inhibit incursion of any foam bubbles into the conduit 44. (As an alternative to being located on the cover 40, the vapor outlet 39 can be located at an upper portion of a side wall 130, on the opposite side of the pot 24 from the reflux vent 143.)

The lower end 136 of the sloped portion 144 extends around (but does not contact or seal against) a thermally conductive ("TC") member 148 (having a fin shape in this embodiment). In the depicted embodiment the TC member 148 is attached to and extends upward from the bottom wall 131 of the pot 24 (FIG. 2) and is attached to and extends radially inward from an adjacent side wall 152 of the pot. (Attachment of the TC member 148 to wall(s) in this manner is facilitated by simply casting the member as part of the pot 24.) Note that the thermostatic switch 110 is mounted to the outside surface of the side wall 130 immediately opposite the location on the inside surface of the side wall from which the TC member extends. This provides the shortest and most direct thermal connection from the liquid to the thermostatic switch (or other thermal sensor). Hence, in the depicted embodiment, whereas the TC member is attached to the bottom wall 131 for convenience in casting, this attachment is not necessary so long as the TC member, in its manner of attachment to a wall, provides the shortest possible thermal conduit to the thermostatic switch.

Also desirably, the TC member has a fin-like shape (for maximal surface-area contact with the liquid in the pot) and extends radially toward the center of the pot 24 (to form the shortest possible thermal conduit from the liquid to the thermal sensor). By way of example, in a pot 24 defining an interior volume of approximately six quarts, the TC member 148 has a height of approximately two inches, a width of approximately one inch, a thickness of approximately $1/8$ inch, and a clearance 150 from the low end of the reflux plate 140 of approximately $3/16$ inch. The top of the TC member 148 desirably is at approximately the normal level of liquid in the pot 24.

A clearance 150 is defined between the TC member 148 and the lower end 136 of the reflux plate 140. During boiling of the liquid in the pot 24, the clearance 150, the sloped portion 144 of the reflux plate 140, and the reflux vent 143 facilitate rapid circulation of fluid in the pot. Specifically, the bubbles moving along the under-surface of the sloped portion 144 and up the reflux vent 143 carry a significant amount of entrained liquid. As the bubbles break against the cover 40, the entrained liquid returns to the liquid above the reflux plate 140. To replace entrained liquid carried from below the reflux plate by the bubbles, liquid passes from above the reflux plate 140 through the clearance 150 to below the reflux plate. This liquid circulation is rapid and always flows immediately past the TC member. As a result, the temperature of the TC member 148 is maintained at the actual temperature of the liquid in the pot 24, even if that temperature is changing.

Figure 2:
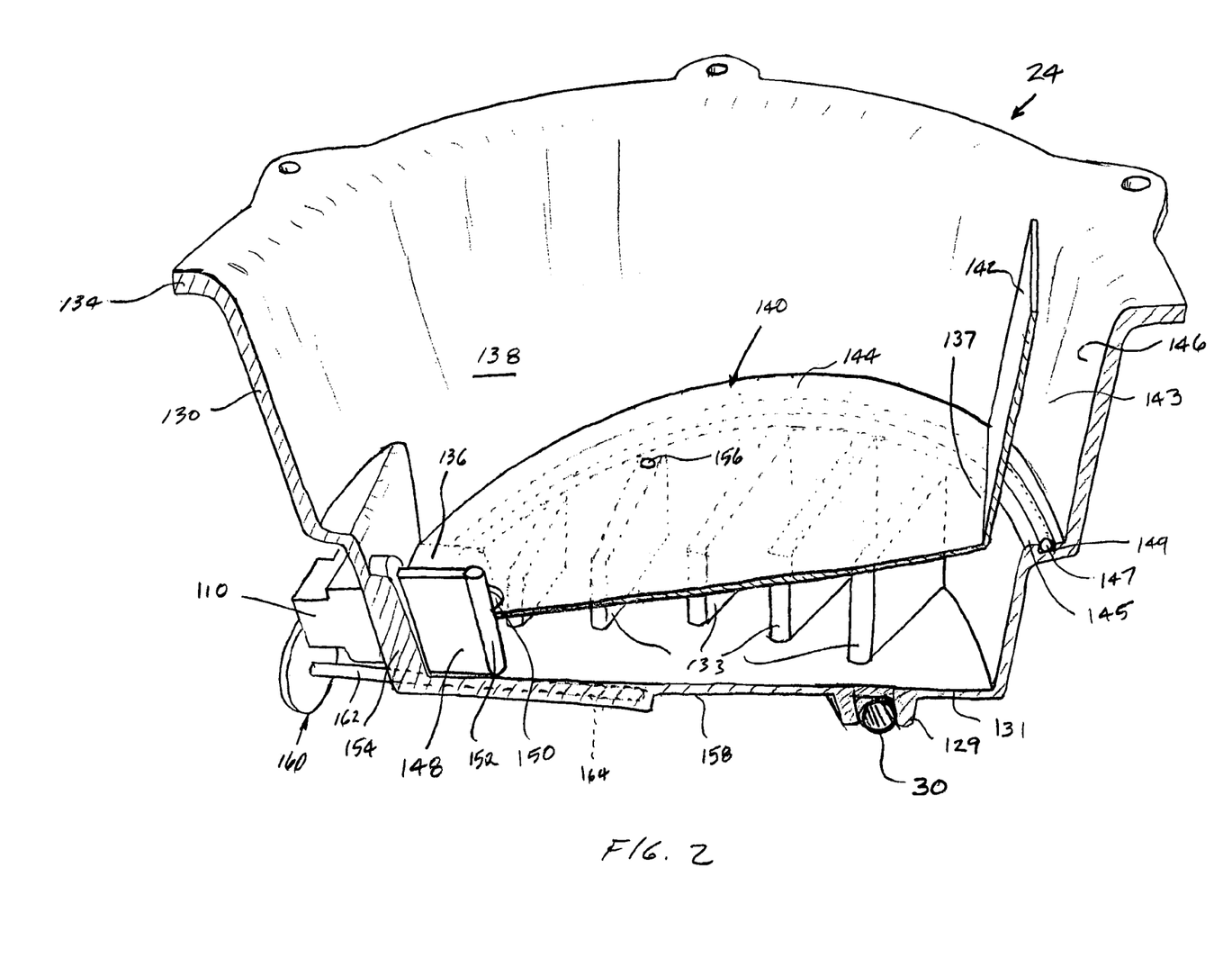
FIG. 2 is an oblique view, in section, of a representative embodiment of a vaporization chamber ("pot"), including a reflux plate and thermally conductive member as described herein.

As noted above, the TC member 148 desirably has a relatively thin, fin-like shape, which is effective for maximizing its surface area while minimizing its mass. In FIG. 2 the TC member 148 is shown as including a cylindrical portion 150, but it will be understood that the cylindrical portion 150 is not necessary for proper functioning of the TC member. Rather, the cylindrical portion 150 simply facilitates removal of the pot 24 from a casting die if the pot 24 is made of cast metal. In any event, the fin-like profile of the TC member 148 (see exemplary dimensions above) provides it with an appropriately low "thermal inertia," by which is meant that the TC member 148 rapidly reaches the current temperature of the liquid or the like with which the TC member 148 is in contact. By way of example, a TC member 148 made of aluminum desirably has a surface-to-volume ratio of at least 20. The dimensions of the TC member 148 typically are not dictated to any significant extent by the particular type of solvent contained in the pot 24 but rather by the need to achieve, via the TC member 148, the lowest possible temperature gradient between the liquid in the pot and the thermostatic switch 110 (or other thermal sensor so located) under actual-use conditions.

In the depicted embodiment, attached to the adjacent side wall 154 on a surface opposite the TC member 148 and outside the pot 24 is the thermostatic switch 110. An exemplary thermostatic switch 110 is any of the "60T" Series of temperature controls manufactured by Therm-O-Disc, Mansfield, Ohio. The TC member 148 establishes a direct thermal conduit from the liquid to the thermostatic switch 110 for accurate sensing of the temperature of the liquid. In other words, the TC member 148 (and intervening wall thickness between the TC member and thermostatic switch) functions as a thermal conduit ("heat pipe") from the liquid in the pot to the thermostatic switch 110. Also, the flow of liquid past the TC member 148 is turbulent and thus does not exhibit thermal stratification. Consequently, the temperature sensed by the thermostatic switch 110 is the temperature of the TC member 148, which is the temperature of the liquid in contact with it. Also, by thus locating the thermostatic switch 110 so as to receive thermal input directly from the TC member 148 rather than the temperature of the bottom wall 131 of the pot, as in conventional distillation systems, temperature sensing and control can be performed in substantially real time.

Extending in association with the bottom wall 131 (e.g., along the lower surface 158 of the bottom wall 131) in the depicted embodiment is a thermometer 160 (e.g., model POC-1, manufactured by Ametek U.S. Gauge, Feasterville, Pa.). The depicted thermometer 160 comprises a probe shaft 162 that extends toward the center of the bottom surface 131 through a corresponding radially extending bore 164 in the bottom surface. The thermometer 160 can be used generally for obtaining a temperature reading of the liquid contained in the pot 24. More specifically, as discussed earlier above, the temperature of the liquid in the pot 24 tends to increase during boiling conditions as the relative concentration of solute in the liquid increases (as it inevitably does over time). Using the thermometer 160, the operator can obtain a direct reading of liquid temperature for determining suitable times for draining solute sludge from the pot 24 (e.g., draining the pot only after the liquid inside has cooled to a relatively "safe" temperature of approximately 150°). (The thermostatic switch 110 can be set so as to turn the heater off at the moment the liquid in the pot reaches a temperature indicating time to drain the pot.) The thermometer 160 also is useful for providing a reading of pot temperature before filling the pot with more liquid to be distilled.

By way of example, the heater 30 is rated at 120 Vac, 600 W, and is manufactured by Watlow Electric Manufacturing Co., St. Louis, Mo.

Whereas the invention has been described above in connection with a preferred embodiment, the invention is not limited to that embodiment. On the contrary, the invention is intended to encompass all modifications, alternatives, and equivalents as may be included within the spirit and scope of the invention, as defined by the appended claims.

What is claimed is:

1. In a distillation system, a distillation pot, comprising:
    walls, including a heated wall, and a cover that collectively define an interior space in which a liquid is contained as the liquid is being heated in the pot for a distillation purpose, the walls and cover having respective inside surfaces;
    a plate configured and situated in the interior space so as to divide the space into an upper portion and a lower portion;
    an upper fluid passageway and a lower fluid passageway defined by the plate in the interior space; and
    a thermally conductive member extending from a location on an inside surface of a wall into the lower fluid passageway so as to be contacted by the liquid in the lower fluid passageway whenever the pot contains liquid being heated for distillation, the thermally conductive member being a direct thermal connection from the liquid to a corresponding location outside the wall, adjacent the location on the inside surface, at which the temperature of the liquid in the pot can be sensed,
    the plate, the upper portion, the upper fluid passageway, the lower portion, and the lower fluid passageway defining a circulation path for the liquid being heated in the pot, the circulation path being configured such that the liquid circulates from the lower portion through the upper fluid passageway to the upper portion, and from the upper portion through the lower fluid passageway past the thermally conductive member to the lower portion.

2. The distillation pot of claim 1, wherein:
    the heated wall is located in the lower portion;
    the thermally conductive member extends into the lower portion; and
    as the liquid is heated in the lower portion, the liquid contacts the thermally conductive member.

3. The distillation pot of claim 1, wherein the upper fluid passageway defines a reflux vent extending from the lower portion and that opens into the upper portion, in which bubbles passing through the upper fluid passageway from the lower portion break in the upper portion to release entrained liquid that drains into the lower portion through the lower fluid passageway.

4. The distillation pot of claim 3, wherein:
    the heated wall is located in the lower portion; and
    bubbles formed in the liquid in the lower portion are guided by the plate to the reflux vent and travel up the reflux vent to the upper portion where the bubbles release entrained liquid for circulation through the lower fluid passageway and past the thermally conductive member to the lower portion.

5. The distillation pot of claim 4, wherein the bubbles are propelled from the reflux vent against the inside surface of the cover, thereby releasing the entrained liquid.

6. In a distillation system, a distillation pot, comprising:
    walls, including a heated wall, and a cover that collectively define an interior space in which a liquid is contained as the liquid is being heated in the pot for a distillation purpose, the walls and cover having respective inside surfaces;
    a reflux plate configured and situated in the interior space so as to have a vertical portion and a sloped portion including a lower end and a higher end, the sloped portion having peripheral edges between the higher and lower ends; and a thermally conductive member extending from a location on an inside surface of a wall into the liquid and configured so as to be contacted by the liquid whenever the pot contains liquid being heated for distillation and to serve as a direct thermal connection from the liquid to a corresponding location outside the wall, adjacent the location on the inside surface, at which the temperature of the liquid in the pot can be sensed, wherein the peripheral edges of the sloped portion are sealingly attached to respective inside surfaces of the walls so as to divide the interior space into an upper portion and a lower portion that communicate with each other via the higher end and the lower end;

the heated wall is located in the lower portion;

the vertical portion extends upward from the higher end relative to a respective inside surface of a wall so as to define a reflux vent between the vertical portion and the respective inside surface, the reflux vent opening in the interior space beneath the cover to provide said communication from the lower portion to the upper portion; and the lower end extends, with an intervening clearance, around the thermally conductive member, the clearance being sufficient to provide said communication from the upper portion to the lower portion such that, as the liquid is being heated in the pot, bubbles formed in the liquid in the lower portion are guided by the sloped portion to the reflux vent, rise up the reflux vent, and are propelled from the reflux vent against the inside surface of the cover, thereby releasing entrained liquid for passage through the clearance to below the reflux plate.

7. The distillation pot of claim 6, further comprising a heater in thermal contact with the heated wall.

8. The distillation pot of claim 7, wherein the heated wall is a bottom wall of the pot.

9. The distillation pot of claim 7, further comprising a thermostatic switch in thermal contact with the corresponding location outside the wall.

10. The distillation pot of claim 6, further comprising a thermal sensor in thermal contact with the corresponding location outside the wall.

11. The distillation pot of claim 10, wherein the thermal sensor is a thermostatic switch.

12. The distillation pot of claim 6, wherein the inside surface of the heated wall defines at least one vane situated and configured to provide thermal transfer from the heated wall to the liquid in the lower portion.

13. The distillation pot of claim 6, wherein the clearance is situated and configured such that, as the liquid flows through the clearance from the upper portion to the lower portion, the liquid flows past the thermally conductive member while contacting the thermally conductive member.

14. The distillation pot of claim 6, wherein the thermally conductive member has a fin-like configuration extending toward a center of the pot.

15. The distillation pot of claim 14, wherein the thermally conductive member has a ratio of surface area to volume of at least 20.

16. The distillation pot of claim 6, wherein:
the heated wall is a bottom wall of the pot; and
the inside surface of the heated wall defines at least one vane situated and configured to increase thermal transfer from the heated wall to the liquid in the pot during heating of the liquid in the lower portion.

17. The distillation pot of claim 6, wherein the lower portion includes a bottom surface that defines a drain port that slopes toward a drain port defined in a wall of the lower portion.

18. The distillation pot of claim 6, having a substantially cylindrical shape as defined by the walls that include a bottom wall and side walls.

19. The distillation pot of claim 18, wherein:
the bottom wall is the heated wall; and
the reflux vent extends upward in the pot, adjacent the side wall.

20. The distillation pot of claim 6, defining a vapor outlet situated on an opposite side of the pot from the reflux vent.

21. The distillation pot of claim 20, wherein the vapor outlet is defined in the cover.

22. The distillation pot of claim 6, further comprising a control valve hydraulically connected to a supply of liquid for distillation in the pot, the control valve comprising a level-sensing mechanism that is responsive to a liquid level in the pot so as to add liquid from the supply to the pot for distillation whenever the liquid in the pot is below a predetermined level.

23. The distillation pot of claim 22, wherein:
the level-sensing mechanism is a float assembly; and
the float assembly is situated in the upper portion.

24. In a distillation system, a distillation pot, comprising:
wall means, including heated wall means, and cover means that collectively define an enclosed interior space in which a liquid is contained as the liquid is being heated in the pot for a distillation purpose, the wall means and cover means having respective inside surfaces;

interior-space-dividing means for dividing the interior space into an upper portion and a lower portion that hydraulically communicate with each other by an upper fluid-passageway means and a lower fluid-passageway means; and thermal-conduction means extending from a location on an inside surface of a wall means into the liquid and configured so as to be contacted by the liquid whenever liquid is in the interior space and is being heated for distillation and to serve as a direct thermal connection from the liquid to a corresponding location outside the wall means, adjacent the location on the inside surface, at which the temperature of the liquid in the pot can be sensed, wherein the thermal-conduction means extends into the lower portion and lower fluid-passageway means so as to contact and be at the temperature of the liquid passing through the lower fluid-passageway means, and, as the liquid is being heated in the pot, the liquid circulates from the lower portion through the upper fluid-passageway means to the upper portion, and from the upper portion through the lower fluid-passageway means past the thermal-conduction means to the lower portion.

25. A distillation system, comprising:
a distillation pot, comprising (a) walls, including a heated wall, and a cover that collectively define an interior space in which a liquid is contained as the liquid is being heated in the pot for a distillation purpose, the walls and cover having respective inside surfaces; (b) a plate configured and situated in the interior space so as to divide the space into an upper portion and a lower portion; (c) an upper fluid passageway and a lower fluid passageway defined by the plate in the interior space;

and (d) a thermally conductive member extending from a location on an inside surface of a wall into the lower fluid passageway so as to be contacted by the liquid in the lower fluid passageway whenever the pot contains liquid being heated for distillation, the thermally conductive member being a direct thermal connection from the liquid to a corresponding location outside the wall, adjacent the location on the inside surface, at which the temperature of the liquid in the pot can be sensed, the plate, the upper portion, the upper fluid passageway, the lower portion, and the lower fluid passageway defining a circulation path for the liquid being heated in the pot, the circulation path being configured such that the liquid circulates from the lower portion through the upper fluid passageway to the upper portion, and from the upper portion through the lower fluid passageway past the thermally conductive member to the lower portion; and a condensing unit situated relative to the pot so as to receive vapor produced by heating of the liquid in the pot and configured to condense the vapor to a corresponding liquid.

26. A distillation system, comprising:

a distillation pot, comprising walls, including a heated wall, and a cover that collectively define an interior space in which a liquid is contained as the liquid is being heated in the pot for a distillation purpose, the walls and cover having respective inside surfaces; a reflux plate configured and situated in the interior space so as to have a vertical portion and a sloped portion including a lower end and a higher end, the sloped portion having peripheral edges between the higher and lower ends; and a thermally conductive member extending from a location on an inside surface of a wall into the liquid and configured so as to be contacted by the liquid whenever the pot contains liquid being heated for distillation and to serve as a direct thermal connection from the liquid to a corresponding location outside the wall, adjacent the location on the inside surface, at which the temperature of the liquid in the pot can be sensed, wherein (i) the peripheral edges of the sloped portion are sealingly attached to respective inside surfaces of the walls so as to divide the interior space into an upper portion and a lower portion that communicate with each other via the higher end and the lower end; (ii) the heated wall is located in the lower portion; (iii) the vertical portion extends upward from the high end relative to a respective inside surface of a wall so as to define a reflux vent between the vertical portion and the respective inside surface, the reflux vent opening in the interior space beneath the cover to provide said communication from the lower portion to the upper portion; and (iv) the lower end extends, with an intervening clearance, around the thermally conductive member, the clearance being sufficient to provide said communication from the upper portion to the lower portion such that, as the liquid is being heated in the pot, bubbles formed in the liquid in the lower portion are guided by the sloped portion to the reflux vent, rise up the reflux vent, and are propelled from the reflux vent against the inside surface of the cover, thereby releasing entrained liquid for passage through the clearance to below the reflux plate; and a condensing unit situated relative to the pot so as to receive vapor produced by heating of the liquid in the pot and configured to condense the vapor to a corresponding liquid.

27. The system of claim 26, further comprising a heater in thermal contact with the heated surface.

28. The system of claim 26, further comprising a thermostatic switch in thermal contact with the corresponding location outside the wall, the thermostatic switch being operably connected to the heater so as to turn off the heater whenever the liquid in the pot reaches a pre-determined temperature.

29. The system of claim 26, wherein the inside surface of the heated wall defines at least one vane situated and configured to provide thermal transfer from the heated wall to the liquid in the lower portion.

30. The system of claim 26, wherein the clearance is situated and configured such that, as the liquid flows through the clearance from the upper portion to the lower portion, the liquid flows past the thermally conductive member while contacting the thermally conductive member.

31. The system of claim 26, wherein the thermally conductive member has a fin-like configuration extending toward a center of the pot.

32. The system of claim 26, having a substantially cylindrical shape as defined by the walls, wherein the heated wall is a bottom wall of the pot, and the inside surface of the heated wall defines at least one vane situated and configured to increase thermal transfer from the heated wall to the liquid in the pot during heating of the liquid in the lower portion.

33. The system of claim 32, further comprising:

a vapor outlet situated in an upper location on an opposite side of the distillation pot from the reflux vent; and a conduit hydraulically connecting the vapor outlet to the condensing unit.

* * * * *